United States Patent
Manjrekar et al.

(10) Patent No.: US 6,735,034 B1
(45) Date of Patent: May 11, 2004

(54) RELATIVE TIMING SEQUENCE FOR READER AMPLIFIERS

(75) Inventors: Ashish Manjrekar, Dallas, TX (US); Echere Iroaga, Garland, TX (US); Bryan Bloodworth, Irving, TX (US); Paul Merle Emerson, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 515 days.

(21) Appl. No.: 09/599,176

(22) Filed: Jun. 22, 2000

(51) Int. Cl.[7] .............................. G11B 15/12; G11B 5/09
(52) U.S. Cl. ............................ 360/61; 360/46; 330/51
(58) Field of Search ............................. 360/46, 53, 61, 360/75; 330/51, 297

(56) References Cited

U.S. PATENT DOCUMENTS

| | | | | | |
|---|---|---|---|---|---|
| 5,070,538 A | * | 12/1991 | Milberger et al. | .......... | 455/126 |
| 5,357,207 A | * | 10/1994 | Ash | .............. | 330/51 |
| 5,446,601 A | * | 8/1995 | Fukuta | .......... | 360/46 |
| 6,380,804 B1 | * | 4/2002 | Ross | ............ | 330/51 |
| 2001/0015867 A1 | * | 8/2001 | Hatanaka et al. | ............. | 360/67 |

* cited by examiner

Primary Examiner—David Hudspeth
Assistant Examiner—Glenda P Rodriguez
(74) Attorney, Agent, or Firm—W. Daniel Swayze, Jr.; W. James Brady; Frederick J. Telecky, Jr.

(57) ABSTRACT

A method and circuit for selectively timing amplifier stages of a multi-stage reader amplifier for a hard disk drive system. The reader amplifier includes a first stage, second stage and third stage coupled in series. The method includes the steps of powering the first stage, delaying the enabling of the second stage, and delaying the enabling of the third stage, in order to reduce excursions on the third stage output signal. The circuit includes a logic circuit for successively enabling the second and third amplifier stages.

21 Claims, 3 Drawing Sheets

RELATIVE TIMING SEQUENCE FOR READER AMPLIFIERS

CROSS-REFERENCE TO RELATED APPLICATIONS

U.S. patent application Ser. No. 09/599,474 filed herewith entitled "Read Head Protection Circuit and Method" by Iroaga et al. is commonly assigned and is incorporated herein by reference.

TECHNICAL FIELD

This invention relates generally to the field of information storage, and more particularly to a circuit and method for timing amplifier stages of a multi-stage reader amplifier for hard disk drive devices.

BACKGROUND OF THE INVENTION

Hard disk drives are mass storage devices that include a magnetic storage media, e.g. rotating disks or platters, a spindle motor, read/write heads, an actuator, a pre-amplifier, a read channel, a write channel, a servo circuit, and control circuitry to control the operation of hard disk drive and to properly interface the hard disk drive to a host system or bus. FIG. 1 shows an example of a prior art disk drive mass storage system 10. Disk drive system 10 interfaces with and exchanges data with a host 32 during read and write operations. Disk drive system 10 includes a number of rotating platters 12 mounted on a base 14. The platters 12 are used to store data that is represented as magnetic transitions on the magnetic platters, with each platter 12 coupleable to a head 16 which transfers data to and from a preamplifier 26. The preamp 26 is coupled to a synchronously sampled data (SSD) channel 28 comprising a read channel and a write channel, and a control circuit 30. SSD channel 28 and control circuit 30 are used to process data being read from and written to platters 12, and to control the various operations of disk drive mass storage system 10. Host 32 exchanges digital data with control circuit 30.

Data is stored and retrieved from each side of the magnetic platters 12 by heads 16 which comprise a read head 18 and a write head 20 at the tip thereof. The read 18 and write 20 heads comprise magneto-resistive heads adapted to read or write data from/to platters 12 when current is passed through them. Heads 16 are coupled to preamplifier 26 that serves as an interface between read/write heads 18/20 of disk/head assembly 10 and SSD channel 28. The preamp 26 provides amplification to the waveform data signals as needed. A preamp 26 may comprise a single chip containing a reader amplifier 27, a writer amplifier, fault detection circuitry, and a serial port, for example. Alternatively, the preamp 26 may comprise separate components rather than residing on a single chip.

FIG. 2 shows a reader amplifier 27 of the prior art comprising input amplifier stage 12 coupled in series to middle amplifier stage 14 which is coupled to output amplifier stage 16. The reader amplifier 27 chain of amplifiers 12, 14, 16 is utilized to obtain the desired amount of gain.

A problem with reader amplifiers 27 of the prior art is that at certain transitional times in operation, all amplifiers 12, 14, 16 are turned off and then turned on at once, resulting in an excursion in the output signal 34 as shown in FIG. 3. The excursion may be +/−40 mV or greater, for example. Such transitional times occur for various reasons in a hard disk drive system. In a disk drive system having multiple platters 12 written to and read by multiple heads 16, head 16 communication with reader amplifier 27 is often multiplexed. When heads 16 are changed, an excursion may be seen in the output signal 34. Another excursion generating transitional time is the read head changing from an idle state to a read state. Often, a reader amplifier 27 will operate in an idle mode to save power. Because the internal transistors of amplifiers 12, 14, and 16 are typically bipolar, there is a temporary saturation effect when turning on the transistors of middle stage 14 and output stage 16. When this occurs, it takes a certain amount of time for the FETs to recover and arrive back into a non-saturated state. In this case it results in a 6 μs recovery time. The excursion shown between time $t_1$ and the time $t_2$ reflects the spike in the output signal on the reader amplifier output when the reader amplifier 27 is switched from one head 16 to another, or from idle mode to read mode, for example. Another factor contributing to the excursion is ringing of the voltage supply from each amplifier stage 12, 14, and 16 suddenly simultaneously drawing current from the voltage supply.

What is needed is a circuit and method for eliminating or minimizing excursions in the output signal of a reader amplifier 27.

SUMMARY OF THE INVENTION

The present invention achieves technical advantages as a reader amplifier circuit and method with improved recovery time when changing from one mode to another, minimizing the excursion on a reader amplifier output signal. A chain of amplifier stages is turned on in a staggered fashion to avoid saturation of transistors in the second and third stages and reduce ringing on the voltage supply. The last output stage is turned on gradually with an RC circuit, reducing ringing and minimizing the excursion of the output signal.

In one embodiment, disclosed is a method of timing the enabling of amplifier stages of a multi-stage reader amplifier for a hard disk drive system. The reader amplifier includes a first stage, second stage and third stage coupled in series. The first stage is adapted to receive an input signal and the third stage is adapted to generate an output signal. The method includes the steps of powering the first stage, delaying the enabling of the second stage, and delaying the enabling of the third stage, wherein excursions on the third stage output signal are reduced.

Also disclosed is a method of timing the enabling of stages of a multi-stage reader amplifier of a hard disk drive system in a reader amplifier having a first stage, a second stage and a third stage coupled in series. The method includes the steps of powering the first stage, waiting a first predetermined time interval, enabling the second stage, waiting a second predetermined time interval, and enabling the third stage so that excursions of the third stage output signal are reduced.

Further disclosed is a reader amplifier circuit for a hard disk drive system, including a first amplifier stage adapted to receive an input signal and a second amplifier stage coupled to the first amplifier stage. A third amplifier stage is coupled to the second amplifier stage and is adapted to generate an output signal. A logic circuit successively enables the second and third amplifier stages such that excursions of the output signal are reduced.

Advantages of the invention include reducing the recovery time after mode transitions and head switch transitions. Saturation of successive amplifier stage transistors is avoided, reducing excursions in the reader amplifier output signal. Ringing on the voltage supply is minimized by staggering the start-up of the chain of amplifiers of the reader amplifier. An additional feature includes delaying the start of the third output stage with an RC circuit, rather than an abrupt turn on.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

Figure 1:
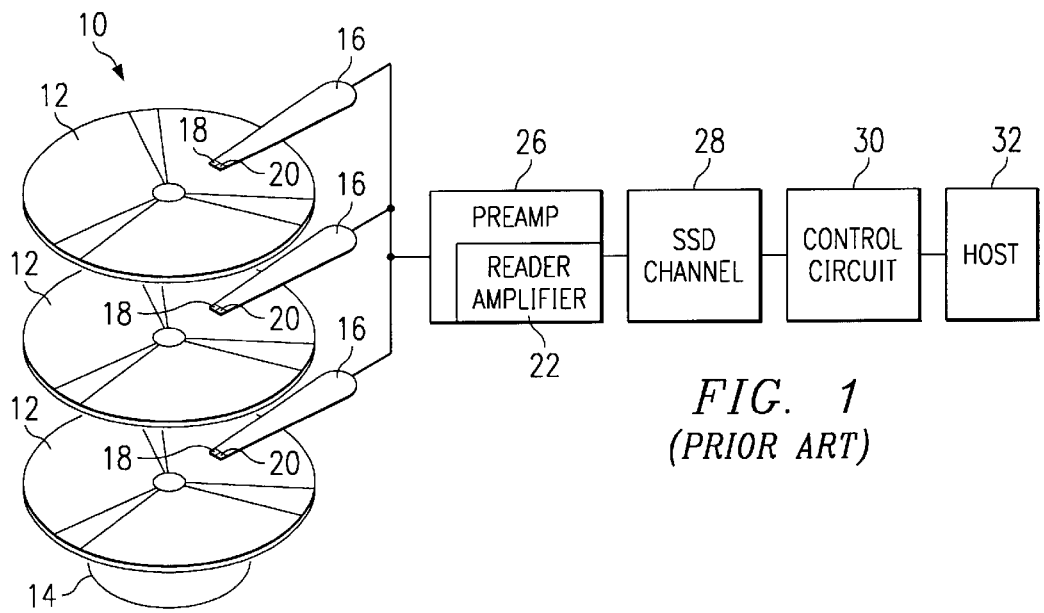
FIG. 1 illustrates a disk drive system of the prior art.
Figure 2:
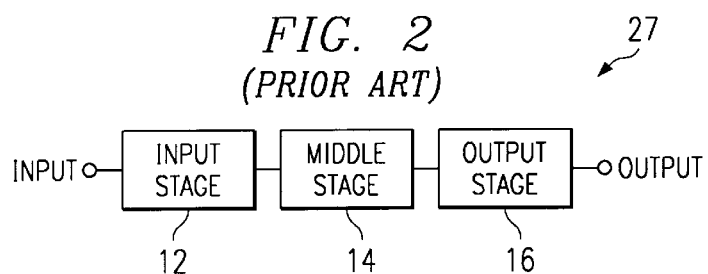
FIG. 2 is a block diagram of a reader amplifier of the prior art.
Figure 3:
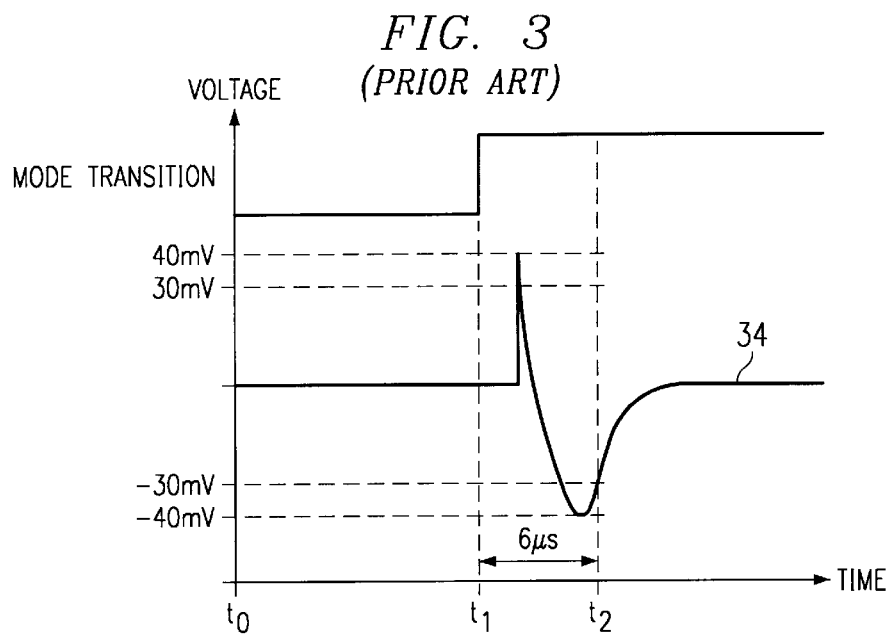
FIG. 3 illustrates an output signal of the prior art reader amplifier shown in FIG. 2 having an excursion at time $t_1$.
Figure 4:
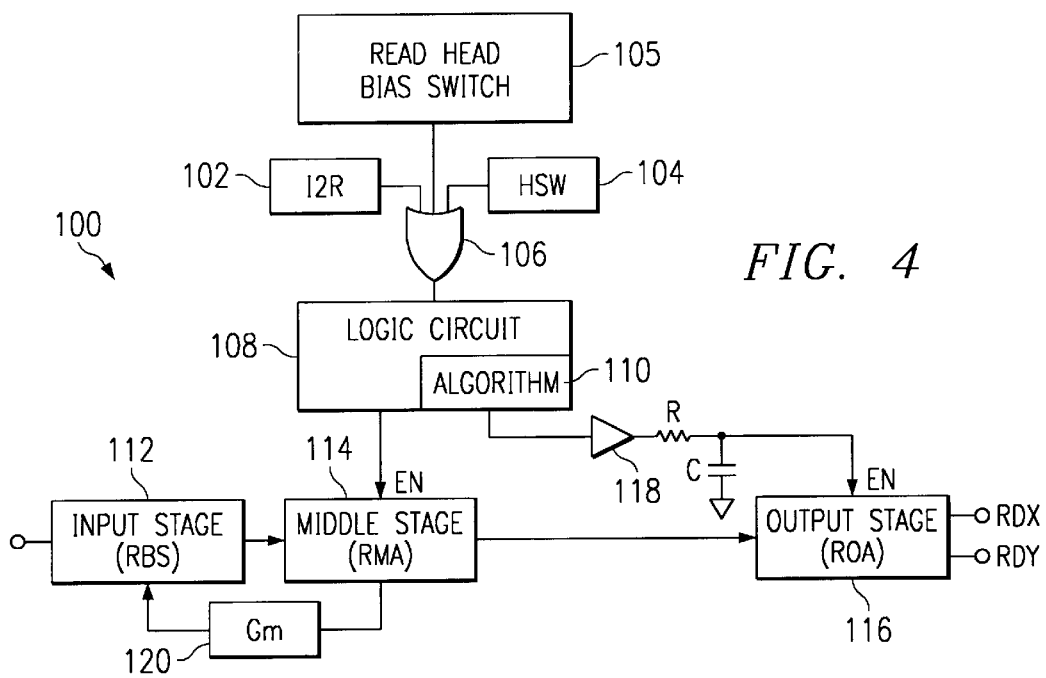
FIG. 4 illustrates a preferred embodiment of the present invention, a reader amplifier including a logic circuit adapted to delay enabling of the middle and output amplifier stages.

FIG. 4 illustrates an exemplary embodiment of the best mode of the present invention. Shown is reader amplifier 100 comprising a first input amplifier stage 112 coupled to and providing a signal to a second middle amplifier stage 114 and a feedback circuit 120 having gain $g_m$. The bias loop created by input amplifier stage 112, middle amplifier stage 114 and feedback circuit 120 is used to maintain the bias. Middle amplifier stage 114 is coupled to and provides a signal to a third output amplifier stage 116. Input amplifier stage 112 may be referred to as a Reader Bias Stage (RBS), middle amplifier stage 114 as a Reader Mid-stage Amplifier (RMA), and output amplifier stage 116 as a Reader Output Amplifier (ROA), for purposes of discussion and with reference to timing diagrams shown in later figures.

Logic circuit 108 generates and provides a separate enable input to both mid-amplifier stage 114 and output amplifier stage 116. To improve recovery time, an RC circuit is coupled between logic circuit 108 and output amplifier stage 116 to provide a slow start up of amplifier stage 116. An inverter 118 is coupled between logic circuit 108 at one end and to resistor R at the other end. Resistor R is coupled to capacitor C, with the other end of the capacitor C being grounded. The enable input to output stage 116 is coupled to the junction of resistor R and capacitor C. Rather than enabling amplifier stage 116 with a digital gate that flips from high to a low as in the prior art, capacitor C charges up gradually, responsively gradually turning on amplifier stage 116 and reducing ringing in the voltage supply and corresponding excursion of output signal.

Logic circuit 108 may comprise an algorithm 110 for selectively controlling the enabling of middle amplifier stage 114 and output amplifier stage 116. The algorithm 110 of the present invention is implemented when the condition idle to read (I2R) 102, head switch (HSW) 104 or read head bias switch 105 are detected. This is illustrated by an OR gate 106 driving the logic circuit 108 and having inputs I2R 102, HSW 104 and read head bias switch 105. When any of these three conditions are detected, the circuit and timing sequence of the present invention are implemented.

Input amplifier stage 112 is preferably always powered on or enabled. Middle stage 114 is enabled a first predetermined time delay after a mode change or transition, for example, greater than 1 microsecond and more preferably, 2.1 microseconds. Output amplifier stage 116 is enabled a second predetermined amount of time after middle stage 114 is enabled, for example, less than 1 microsecond and more preferably 200 nanoseconds. The output stage 116 is gradually enabled and as a function of the RC circuit coupled at its enable input. The first and second predetermined time delays may vary according to the specific circuit and application and are preferably sufficient to reduce an excursion and improve recovery time of the output signal 122 of FIG. 7.

Figure 5:
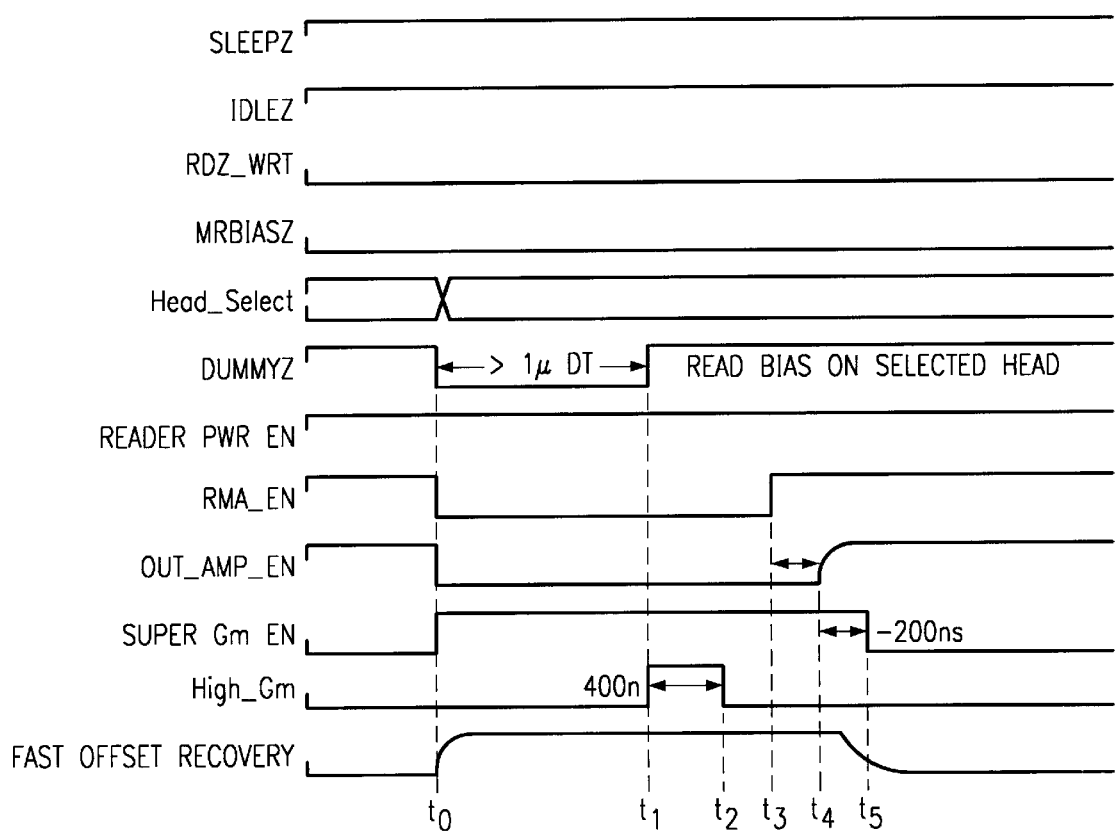
FIG. 5 shows a timing diagram for a head switch or head select mode of the present invention.

FIG. 5 shows a timing diagram for the reader amplifier circuit 100 of FIG. 4. When the head 16 is switched at time to, signal Head_Select changes state, activating the current algorithm 110. At time $t_0$, the reader amplifier 100 diverts to a dummy head resistor $R_{dummy}$ as described in commonly assigned patent application, Ser. No. 09/599,474 entitled "Read Head Protection Circuit and Method" filed herewith by Iroaga et al., the teachings of which are incorporated herein by reference. During a head or bias change, the reader amplifier 100 diverts current to the dummy head for approximately 1 microsecond. After a dummy time (DT) of approximately 1 microsecond during which the dummy head current settles, a read bias signal is placed on the selected head at time $t_1$ (signal High_Gm).

After a first predetermined time interval, preferably around 2.1 microseconds after time $t_0$, at time $t_3$, middle amplifier stage 114 is enabled by logic circuit 108, indicated by signal RMA_EN. After a second predetermined period of time, 200 nanoseconds in this preferred embodiment, output amplifier stage 116 is enabled by logic circuit 108 at time $t_4$ (OUT_AMP_EN signal). Note the ramp-up of the signal OUT_AMP_EN at $t_4$ rather than being instantaneously turned on, due to the RC circuit at the enable input of output stage 116.

Figure 6:
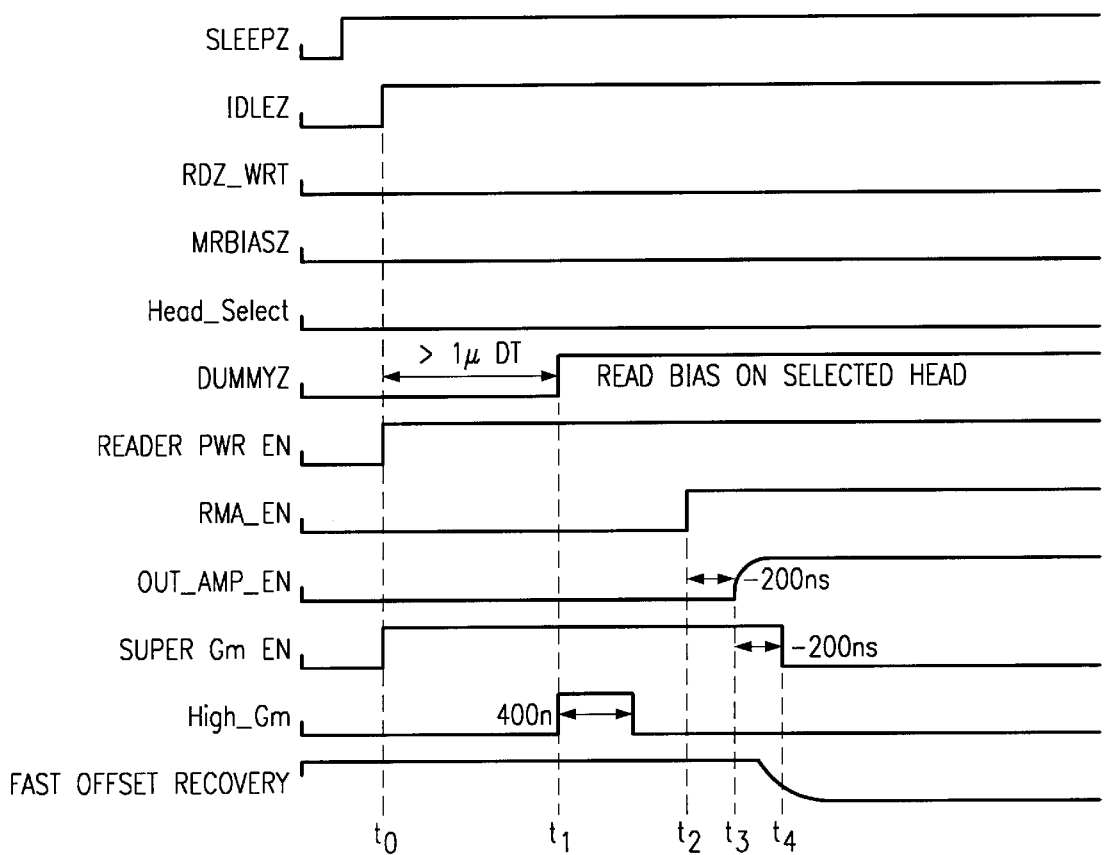
FIG. 6 shows a timing diagram for an idle to read mode of the present invention.

FIG. 6 shows a timing diagram for the idle to read mode of the present invention. When the reader amplifier circuit 100 changes from an idle state to a read state, amplifier stages 112, 114 and 116 are turned on in a staggered fashion in accordance with the present invention. Similar to the head switch case previously described, input stage 112 is always turned on. The end of an idle mode is detected at time $t_0$ (signal IDLEZ). The reader amplifier 100 diverts current to the dummy head Rdummy for approximately 1 microsecond. After a dummy time (DT) of approximately 1 microsecond during which the dummy head current settles, a read bias is placed on the selected head at time $t_1$ (signal High_Gm). At time $t_2$ middle amplifier stage 114 is enabled (signal RMA_EN), approximately 2.1 microseconds after transition time $t_0$. At time $t_3$, output stage 116 is enabled (OUT_AMP_EN) in a delayed manner due to the RC circuit coupled to output stage 116 enable input.

Figure 7:
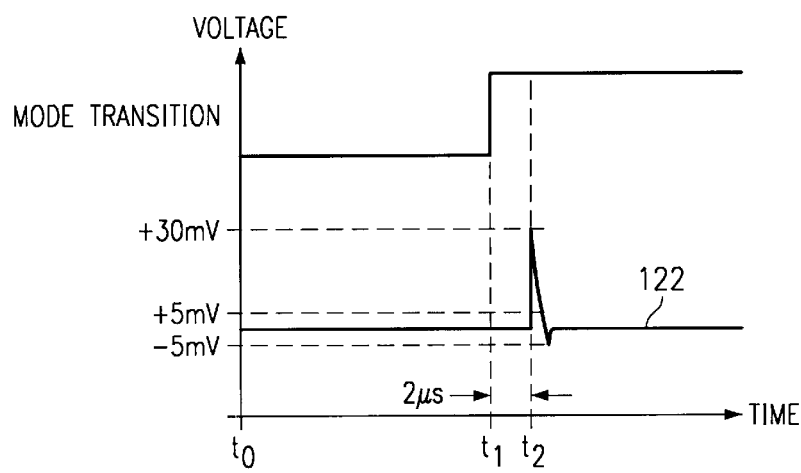
FIG. 7 illustrates an output signal from the present reader amplifier having a reduced excursion at time $t_1$.

FIG. 7 shows the improved output signal 122 of reader amplifier 100 in accordance with the present invention. The amplitude of the excursion in the positive and negative direction is decreased due to staggering the turn-on or enabling of middle stage 114 and output stage 116 of the reader amplifier 100. Successively and sequentially turning on second 114 and third 116 stages decreases the output signal excursion amplitude from around 40 mV as in the prior art to less than 5 mV with the present invention. Recovery time is decreased to about 2 microseconds ($t_2-t_1$).

The novel circuit and method of the present invention achieves technical advantages as a reader amplifier circuit having an improved recovery time after transitions, due to the absence of a large excursion upon changing from idle to read mode, upon switching of heads or switching the read head bias. Because the turn-on of amplifiers 112, 114 and 116 is successive or staggered, saturation of internal devices is avoided, and the reader amplifier 100 output 122 settles faster than in the prior art. With the present invention, the hard disk drive system may be used much faster after changing states. Ringing on the voltage supply is minimized by staggering the start-up of the chain of amplifiers 112, 114, and 116 of the reader amplifier 100. Furthermore, the RC circuit coupled to the enable input of output stage 116 results in gradually enabling output stage 116, reducing ringing.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of timing amplifier stages of a multi-stage reader amplifier for a hard disk drive system, said reader amplifier comprising a first stage, second stage and an output stage coupled in series, said first stage adapted to receive an input signal, said output stage adapted to generate an output signal, said method comprising the steps of:
   powering said first stage;
   enabling said second stage a first predetermined time after powering said first stage; and
   enabling said output stage a second predetermined time after enabling said second stage, wherein excursions on said output signal of said output stage are reduced.

2. The method according to claim 1 wherein said reader amplifier comprises a logic circuit adapted to enable said second and output stages, wherein said logic circuit comprises an algorithm including establishing said first and second predetermined times.

3. The method according to claim 2 wherein an RC circuit is coupled between said logic circuit and said output stage, said RC circuit delaying the enabling of said output stage in a gradual manner.

4. The method according to claim 3 wherein said first predetermined time comprises at least 1 microsecond, wherein said second predetermined time comprises less than 1 microsecond.

5. The method according to claim 4 wherein said first predetermined time is about 2.1 microseconds and said second predetermined time is about 200 nanoseconds.

6. The method according to claim 1 wherein said hard disk drive system is adapted to operate in an idle mode and a read mode, wherein said method is responsively performed when changing from said read mode or when a read head bias is changed.

7. The method according to claim 1 wherein said hard disk drive system comprises a plurality of heads, wherein said method is responsively performed when changing from one said head to another said head.

8. A method of timing stages of a multi-stage reader amplifier of a hard disk drive system, said reader amplifier comprising a first stage, a second stage and an output stage coupled in series, said output stage adapted to generate an output signal, said method comprising the steps of:
   powering said first stage;
   waiting a first predetermined time interval;
   enabling said second stage;
   waiting a second predetermined time interval; and
   enabling said output stage, wherein excursions of said output signal of said output stage are reduced.

9. The method according to claim 8 wherein said reader amplifier comprises a logic circuit adapted to selectively enable said second and output stage, wherein said logic circuit comprises an algorithm including a timing sequence for staggering the enabling of said second and output stages.

10. The method according to claim 9 wherein an RC circuit is coupled between said logic circuit and said output stage, said RC circuit delaying the enabling of said third stage in a gradual manner.

11. The method according to claim 8 wherein said first predetermined time comprises at least 1 microsecond, wherein said second predetermined time comprises less than 1 microsecond.

12. The method according to claim 11 wherein said first predetermined time is about 2.1 microseconds and said second predetermined time is about 200 nanoseconds.

13. The method according to claim 8 wherein said hard disk drive system is adapted to operate in an idle mode and a read mode, wherein said method is responsively performed when changing from said idle to said read mode or when a read head bias is changed.

14. The method according to claim 8 wherein said hard disk drive system comprises a plurality of heads, wherein said method is responsively performed when changing from one said head to another said head.

15. A reader amplifier circuit for a hard disk drive system, comprising:
   a first amplifier stage adapted to receive an input signal;
   a second amplifier stage coupled to said first amplifier stage;
   an output amplifier stage coupled to said second amplifier stage adapted to generate an output signal; and
   a logic circuit successively enabling said second and then said output amplifier stages, whereby excursions of said output signal are reduced.

16. The circuit according to claim 15 wherein said logic circuit is adapted to delay enabling said second amplifier stage by at least 1 microsecond after a mode change of the reader amplifier circuit, and wherein said logic circuit is adapted to delay enabling said output amplifier stage by less than 1 microsecond after enabling said second amplifier stage.

17. The circuit according to claim 16 wherein said logic circuit Is adapted to delay enabling said second amplifier stage by 2.1 microseconds after a mode change of the reader amplifier circuit and said third amplifier stage by 200 nanoseconds.

18. The circuit according to claim 15 further comprising an RC circuit coupled between said second amplifier stage and said logic circuit, said RC circuit adapted to delay the enabling of said output amplifier stage.

19. The circuit according to claim 15 wherein said hard disk drive system is adapted to operate in an idle mode and a read mode, wherein said method is responsively performed when changing from said idle to said read mode or when a read head bias is changed.

20. The circuit according to claim 15 wherein said hard disk drive system comprises a plurality of heads, wherein said method is responsively performed when changing from one said head to another said head.

21. A method of timing amplifier stages of a multi-stage reader amplifier for a hard disk drive system, said reader amplifier comprising a first stage, second stage and an output stage coupled in series, said first stage adapted to receive an input signal, said output stage adapted to generate an output signal, said method comprising the steps of:

powering said first stage;

enabling said second stage a first predetermined time after powering said first stage; and gradually enabling said output stage a second predetermined time after enabling said second stage, wherein excursions on said output signal of said output stage are reduced.

* * * * *